No. 762,194. PATENTED JUNE 7, 1904.
W. PORTEN.
APPARATUS FOR MOLDING CONCRETE BUILDING BLOCKS.
APPLICATION FILED NOV. 9, 1903.
NO MODEL.
4 SHEETS—SHEET 4.

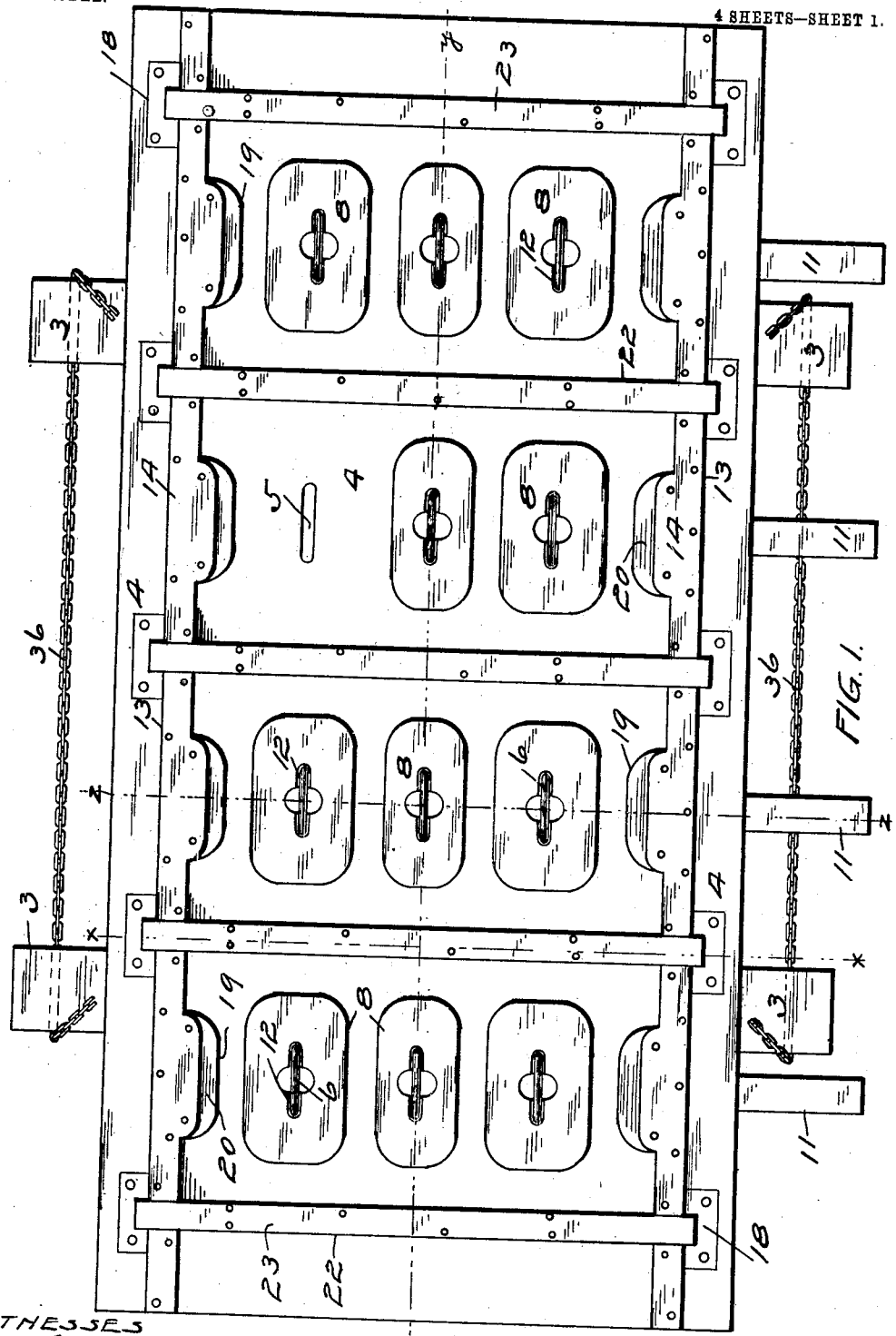

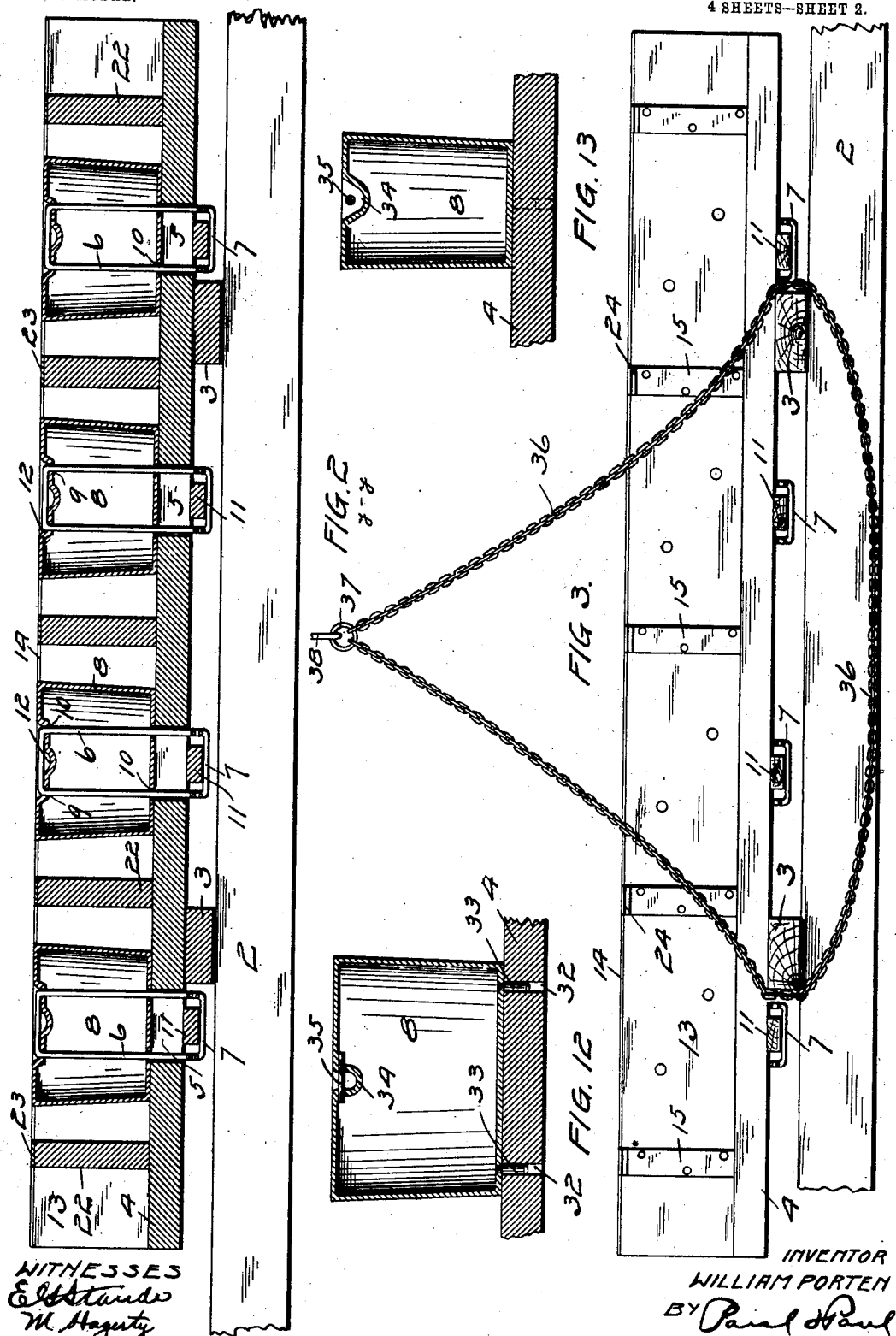

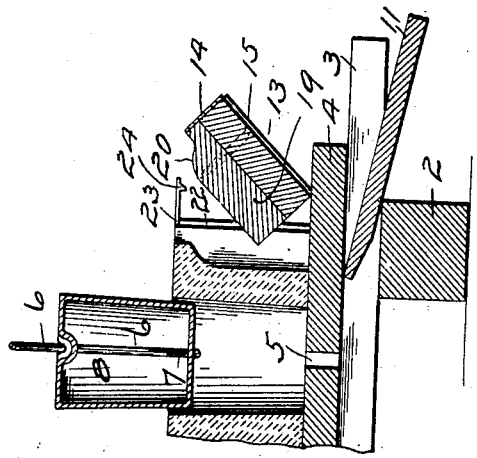

WITNESSES
E. G. Staude
M. Hagerly

INVENTOR
WILLIAM PORTEN
BY Paul & Paul
HIS ATTORNEYS

No. 762,194.

Patented June 7, 1904.

UNITED STATES PATENT OFFICE.

WILLIAM PORTEN, OF ST. PAUL, MINNESOTA, ASSIGNOR TO BUILDING BLOCK MANUFACTURING CO., A CORPORATION OF MINNESOTA.

APPARATUS FOR MOLDING CONCRETE BUILDING-BLOCKS.

SPECIFICATION forming part of Letters Patent No. 762,194, dated June 7, 1904.

Application filed November 9, 1903. Serial No. 180,353. (No model.)

*To all whom it may concern:*

Be it known that I, WILLIAM PORTEN, of St. Paul, Ramsey county, Minnesota, have invented certain new and useful Improvements in Apparatus for Molding Concrete Building-Blocks, of which the following is a specification.

My invention relates to a molding apparatus designed particularly for use with the liquid process of molding building-blocks, though equally adapted for the so-called "dry" process.

The object of the invention is to provide a mold having cores and collapsible walls, and into which mold the material in a liquid form is poured and allowed to become thoroughly dry and hard or set before removal.

A further object is to provide a molding apparatus which after the operation of molding is completed can be easily and quickly taken up and set away in vertical rows, if desired, to allow the blocks to dry.

Other objects of the invention will appear from the following detailed description.

The invention consists generally in various constructions and combinations, all as hereinafter described, and particularly pointed out in the claims.

Figure 9:
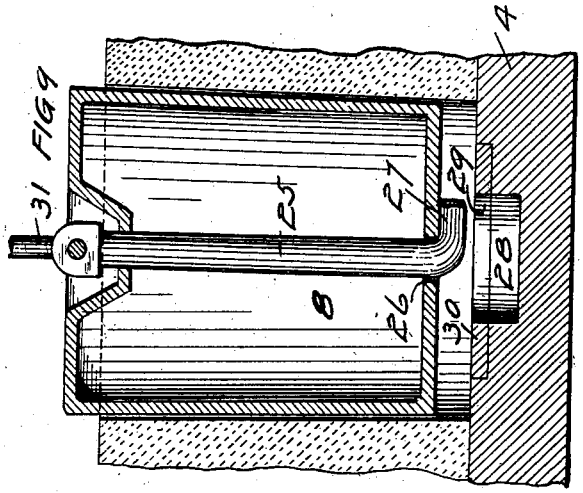
Figure 11:
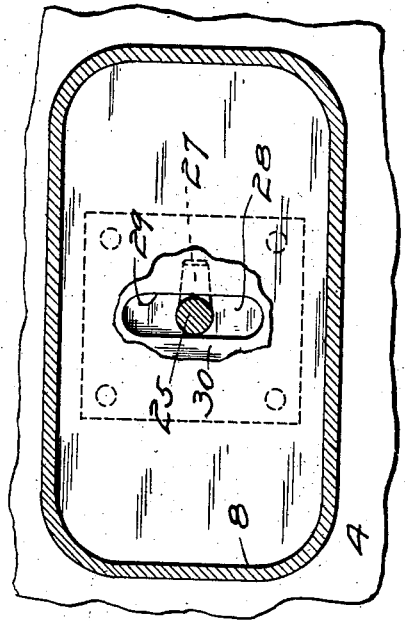
Figure 8:
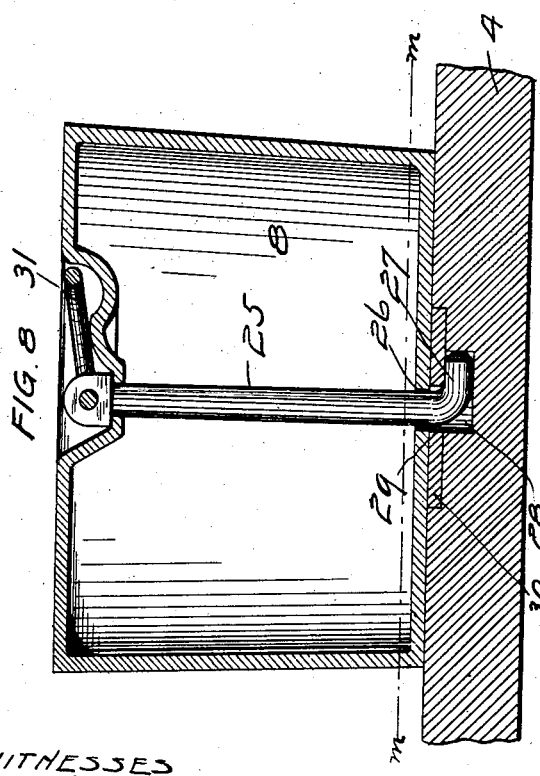
Figure 10:
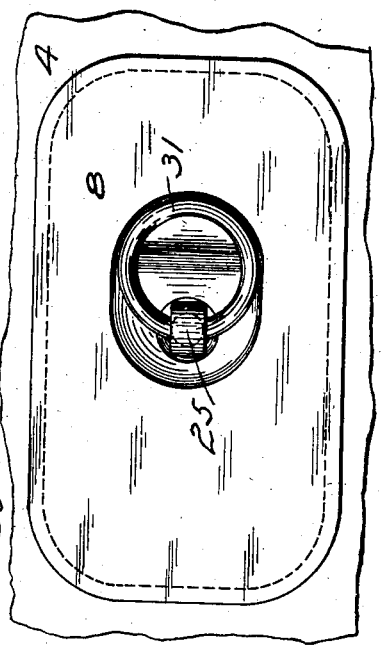

In the accompanying drawings, forming part of this specification, Figure 1 is a plan view of a block-molding apparatus embodying my invention. Fig. 2 is a longitudinal vertical section on the line *y y* of Fig. 1. Fig. 3 is a side elevation. Fig. 4 is a transverse section on the line *x x* of Fig. 1. Fig. 5 is a similar view on the line *z z* of Fig. 1. Fig. 6 is a detail sectional view showing the manner of removing the cores and the side walls of the mold. Fig. 7 is a detail sectional view showing the manner of locking the side walls in their upright position. Fig. 8 is a vertical section showing a modified means for locking the cores in place on the molding-platform. Fig. 9 is a similar view taken on a section-line substantially at right angles to the section-line of Fig. 8. Fig. 10 is a plan view of the core. Fig. 11 is a horizontal section on the line *m m* of Fig. 8. Fig. 12 is a vertical section showing a modified means for retaining the cores in place on the molding-platform. Fig. 13 is a similar view taken on a section-line substantially at right angles to the section-line of Fig. 12.

In the drawings, 2 represents horizontal parallel timbers whereon the molding apparatus is supported.

3 represents cross-bars resting upon the timbers 2 and projecting out beyond the same and the sides of the mold proper, as shown in Fig. 1.

4 is a horizontal molding platform or floor secured to the cross-bars 3 by any suitable means and provided with slots 5, arranged in transverse rows at uniform intervals and adapted to receive rectangular locking-links composed of sections 6 and 7, that are carried by cores 8. These cores are preferably of cast metal, tapered slightly from the top toward the bottom and provided with holes 9 and 10 in their upper and lower ends to receive the links 6, which are thrust therethrough. The sections 7 of the links are then secured to the sections 6, and disengagement of the links from the cores is thereby prevented. The links are considerably longer than the cores, and hence drop down through the molding-platform and depend sufficiently below the same to receive locking-bars 11, that are thrust through the links at one side of the platform and serve to lock the cores firmly in place thereon. The bars are, however, readily removable to allow the links to slide to the limit of their upward movement, where their upper ends will form handles for the operator to grip for the purpose of removing the cores from the molds. The tops of the cores are preferably provided with slight depressions 12, into which the upper ends of the links drop, where they are substantially on a level with the upper ends of the cores and partially concealed when the apparatus is ready for molding.

The platform is provided on each side with longitudinally-arranged side walls 13, having strengthening-plates 14 on their upper edges and transversely-arranged straps 15 at intervals, the lower ends of said straps being outwardly turned to form hooks 16 to enter recesses 17 in said platform. These recesses are partially covered by plates 18, which engage hooks 16 when the side walls are in an upright position and prevent their accidental disengagement from the platform. The recesses 17 are of sufficient size, however, to allow the disengagement of the hooks 16 from the plates 18 when the side walls are tilted outwardly to a position substantially as shown in Figs. 6 and 7. Fixed cores 19 are provided on the side walls 13 opposite the rows of cores and have shoulders 20 near their upper ends, which cause the formation of ledges in the upper ends of the recesses formed in the ends of the blocks by said side-wall cores, said ledges facilitating the handling of the blocks during the operation of building a wall. The walls 13 also have vertical mortises 21 to receive the ends of partition-walls 22, that are arranged transversely on the molding-platform between the rows of cores thereon and provided on their upper edges with flat plates 23, that extend beyond the ends of said partition-walls over said side walls and have hooks 24, that engage the upper edges of said side walls to lock them and said partition-walls together. These overhanging or projecting hooked ends have sufficient spring to allow the side walls to be pushed into their upright position, when the hooks 24 will snap down over the edges of the side walls and lock them in place.

In Figs. 8, 9, 10, and 11 I have shown a modified means for securing the cores in place on the molding-platform. This means consists in a pin 25, passing through the top of the core and through a slot 26 in the bottom thereof and having a laterally-turned end 27 to enter a recess 28 in the bottom of the platform through a slot 29 in a plate 30. A ring 31 is provided on the upper end of the pin 25, and after its lower end has been thrust through the slot 29 the operator will give this pin a quarter-turn, thereby causing the end 27 to slip under the plate 30 and lock the core on the platform.

In Figs. 12 and 13 I have shown still another modification in a means for holding the cores in place on the platform, which consists in providing holes 32 in the platform, adapted to receive pins 33 on the lower ends of the cores. A depression 34 is provided in the top of the core, and extending across the same is a bar 35, that is engaged by a hook or other suitable tool in the hand of the operator when it is desired to remove a core from the mold. 36 is a chain that is looped around the cross-bars 3 on both sides of the molding apparatus and is provided with a ring 37, to which a carrier chain-hook 38 is connected.

I have not thought it necessary in this application to show an overhead track and carrier, as the same forms no part of my invention. It will be understood, however, that such a carrier may be arranged above the molding apparatus and that as soon as the molds are filled the carrier can be operated to pick up the apparatus and convey it to some point where the blocks are allowed to dry and harden.

The manner of using my improved molding apparatus is as follows: The side and partition walls are first set up and secured together. The cores are then put in place on the platform, and if the locking means shown in Fig. 2 is employed the links are allowed to drop down through the slots 15 until their lower ends project sufficiently below the platform to enable the locking-bars 11 to be slipped into place between them to hold the cores firmly in place during the molding operation. When the apparatus is ready for molding, the operator will pour the material in a liquid form into the molds, which may be done by means of pails or suitable buckets supported on a carrier. The operator will then, by means of the chain 36 and a carrier, transport the platform and blocks to a suitable place in the yard to dry.

With an apparatus of this kind it is evident that a large number of blocks can be molded in a comparatively short space of time and that a yard equipped with a number of molding-platforms and a sufficient number of side and partition walls and cores can mold a larger number of building-blocks without lifting or handling them in any way and in a much shorter space of time than is usually required to manufacture such blocks with the machines in general use.

I claim as my invention—

1. An apparatus for molding building-blocks, comprising a platform, cores tapered from the top toward the bottom arranged thereon independently of each other in rows at uniform intervals and having depressions at their upper ends provided with hook-engaging means, means preventing lateral movement of said cores on said platform, side walls mounted on said platform, partition-walls arranged between the rows of cores, and means for temporarily securing said side and partition walls together.

2. An apparatus for molding concrete building-blocks, comprising a platform, cores arranged in rows thereon, means for preventing lateral movement of said cores on said platform, side walls arranged on said platform and partition-walls provided on said platform between the rows of cores and spring fastening devices provided on said partition-walls and arranged to engage the upper edges of said side walls to temporarily secure said side and partition walls together.

3. An apparatus for molding concrete building-blocks, comprising a platform having rows of slots therein, cores arranged to rest upon said platform over said slots, links carried by said cores and having lower ends adapted to enter said slots and project therethrough below said platform, means engaging said links to lock the rows of cores, side walls provided on said platform, partition-walls arranged between the rows of cores, and means for securing said side and partition walls together.

4. An apparatus for molding concrete building-blocks, comprising a platform having a series of slots therein, cores arranged on said platform over said slots, links carried by said cores and having lower ends adapted to enter said slots and project below the same, bars provided below said platform and fitting into the lower ends of the rows of links and preventing the accidental disengagement of the same from said slots, side walls provided on said platform, partition-walls separating the rows of cores, and means for locking said side and partition walls together.

5. An apparatus for molding concrete building-blocks by a so-called wet process comprising a platform, movable cores supported thereon in rows and means preventing their lateral movement, partition-walls arranged between the rows of cores and dividing said platform into a series of individual molds, side walls connecting the ends of said partition-walls and means for temporarily securing them together, and end cores having shoulders intermediate to their ends and arranged opposite the ends of the rows of movable cores.

6. An apparatus for molding concrete building-blocks by a so-called wet process comprising a platform, movable cores supported thereon in rows and means preventing their lateral movement, partition-walls arranged between the rows of cores and dividing said platform into a series of individual molds, side walls connecting the ends of said partition-walls and means for temporarily securing them together, and end cores opposite the ends of the rows of movable cores and being of less depth at the top than at the bottom and having an intermediate shoulder, for the purpose specified.

7. An apparatus for molding building-blocks by a so-called wet process, comprising a platform, cores tapered from the top toward the bottom arranged on said platform in rows at uniform intervals, partition-walls arranged between the rows of cores and dividing said platform into a series of independent molds, side walls connecting the ends of said partition-walls, means for temporarily securing said side and partition walls together, and cores having shoulders intermediate to their ends provided on said side walls opposite the ends of the rows of movable cores.

8. In a mold for building-blocks, a core and a link carried thereby, in combination with a platform having a slot to receive said link, and securing means for said link.

In witness whereof I have hereunto set my hand this 31st day of October, A. D. 1903.

WILLIAM PORTEN.

In presence of—
RICHARD PAUL,
M. HAGERTY.